US010363710B2

(12) United States Patent
Rodriguez et al.

(10) Patent No.: US 10,363,710 B2
(45) Date of Patent: Jul. 30, 2019

(54) CREATING HOMOGENEOUS OPTICAL ELEMENTS BY ADDITIVE MANUFACTURING

(71) Applicant: Indizen Optical Technologies of America, LLC, Torrance, CA (US)

(72) Inventors: Diego Rodriguez, Madrid (ES); José Alonso Fernández, Madrid (ES); Daniel Crespo Vázquez, Rancho Palos Verdes, CA (US); Juan Antonio Quiroga, Madrid (ES)

(73) Assignee: Indizen Optical Technologies of America, LLC, Torrance, CA (US)

( * ) Notice: Subject to any disclaimer, the term of this patent is extended or adjusted under 35 U.S.C. 154(b) by 329 days.

(21) Appl. No.: 15/004,567

(22) Filed: Jan. 22, 2016

(65) Prior Publication Data

US 2017/0210072 A1    Jul. 27, 2017

(51) Int. Cl.

| | |
|---|---|
| *B29D 11/00* | (2006.01) |
| *G02B 5/02* | (2006.01) |
| *G02B 1/10* | (2015.01) |
| *G02B 1/12* | (2006.01) |
| *B29C 64/135* | (2017.01) |
| *B29C 64/264* | (2017.01) |
| *B33Y 10/00* | (2015.01) |
| *B33Y 30/00* | (2015.01) |
| *B33Y 80/00* | (2015.01) |
| *B29K 105/00* | (2006.01) |
| *B29L 11/00* | (2006.01) |

(52) U.S. Cl.
CPC ...... *B29D 11/00009* (2013.01); *B29C 64/135* (2017.08); *B29C 64/264* (2017.08); *G02B 1/10* (2013.01); *G02B 1/12* (2013.01); *G02B 5/0252* (2013.01); *B29K 2105/0058* (2013.01); *B29L 2011/0016* (2013.01); *B33Y 10/00* (2014.12); *B33Y 30/00* (2014.12); *B33Y 80/00* (2014.12)

(58) Field of Classification Search
CPC ............ B29C 67/0066; B29C 67/0092; B29C 64/135; B29C 64/264; B29D 11/00009; B33Y 10/00; B33Y 30/00; B33Y 80/00; G02B 1/10
See application file for complete search history.

(56) References Cited

U.S. PATENT DOCUMENTS

| | | |
|---|---|---|
| 6,505,937 B1 | 1/2003 | Saba |
| 2004/0159967 A1 | 8/2004 | Farnworth |
| 2012/0104291 A1 | 5/2012 | Hohn et al. |
| 2012/0155079 A1 | 6/2012 | Miura |
| 2012/0188791 A1 | 7/2012 | Voloschenko et al. |
| 2012/0293978 A1* | 11/2012 | Guo ........................ F21K 9/135 362/84 |

(Continued)

OTHER PUBLICATIONS

World Intellectual Property Organization, International Search Report and Written Opinion for International Application No. PCT/US2017/013674, dated Apr. 4, 2017, 13 total pages.

*Primary Examiner* — Mathieu D Vargot
(74) *Attorney, Agent, or Firm* — Socal IP Law Group LLP; Mark A. Goldstein; Nikki Dossman (57) ABSTRACT

Systems and methods for additive manufacturing a homogeneous optical element are disclosed herein. A homogeneous pattern of light is shined on a polymerizable liquid to form each polymerized solid layer of the optical element.

23 Claims, 9 Drawing Sheets

(56) References Cited

U.S. PATENT DOCUMENTS

| | | | |
|---|---|---|---|
| 2013/0016520 A1* | 1/2013 | Reimer | G02B 5/0278 362/558 |
| 2015/0137426 A1* | 5/2015 | Van Esbroeck | B33Y 10/00 264/401 |
| 2015/0276987 A1 | 10/2015 | McKenzie et al. | |
| 2015/0277146 A1* | 10/2015 | Crespo | B29D 11/00442 264/1.36 |

* cited by examiner

CREATING HOMOGENEOUS OPTICAL ELEMENTS BY ADDITIVE MANUFACTURING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the making of ophthalmic elements and in particular to methods of improving the quality of eyewear lenses made by using additive techniques, and the products obtained therefrom.

Description of the Related Art

Prescription eyewear lenses (spectacle lenses or ophthalmic lenses) are used to correct refractive errors of human vision. Eyewear lenses may be used for protection, namely to protect the eyes from excess light or from a mechanical, chemical or biological hazard.

Two main technologies are used to shape the surfaces of eyewear lenses. One shaping technology is molding. With molding, a reference surface is made in glass or other material, and the reference surface is replicated on the eyewear lens by mold casting or injection molding. The other shaping technology is grinding and polishing, where a solid piece of optical material is mechanically ground (or milled) and polished until the required surface is obtained.

Prescription eyewear lenses are characterized by the large number of possible different lenses that can be potentially made. Lenses can be different in regard to lens material, modifiers embedded in the lens, coatings, power and power distribution. As refractive errors are measured in steps of 0.25 D, which is considered to be the distinguishable average threshold for human blur perception, there is a limit to the number of different optical powers that could be potentially used. Nevertheless, modern digital lenses available since around 2000 may be tailored to the user's characteristics or needs, taking into account the actual position of the lens with respect to the eye. As a consequence, the optimization of the optical performance of the eyewear lens for each individual requires the capacity of producing lenses with a large variety of optical powers. Similarly, multifocal eyewear lenses used primarily for presbyope individuals have a continuous variation of power across the lens aperture, allowing the user to sharply focus at different distances. Once again, the number of different power distributions in these multifocal lenses is virtually infinite.

Modern digital grinding (milling) and polishing technology may be used to produce arbitrary surfaces. In this way it is well suited for making eyewear lenses with the required shape variability. However, mechanical grinding and polishing is a subtractive process that requires complex and expensive machinery to guarantee the accuracy level required for eyewear products. Mechanical grinding and polishing requires expensive tooling and equipment for proper alignment, and uses expensive consumables including cutting tools, polishing slurries, polishing pads, and coolants. Plus, mechanical grinding and polishing is an energy consuming process that also produces a lot of waste, which is difficult to handle and eliminate.

Molding is not a subtractive method, but it requires the previous manufacturing of the mold itself. When the number of required lens surfaces is too numerous, molding becomes unpractical because the number of lens surfaces molded (or cast) from each mold are too low in number, resulting in a large number of molds that must be produced and kept on hand.

The optical industry has employed a hybrid method combining molding and mechanical techniques, which is possible thanks to the additive nature of optical power. A lens element has two polished surfaces, and its optical power can be distributed between the two surfaces. One of the surfaces can be normalized to a relatively small number of different shapes, which are made by molding, and the other surface is ground/polished to a shape required to obtain the desired optical power and optical power distribution. This way, the manufacturing of eyewear lenses is split in a two-step process. First, semi-finished lens blanks are produced by casting or injection molding. A lens manufacturer buys and stores these blanks, or produces the blanks. Second, when a lens manufacturer receives a lens order, an appropriate lens blank is selected and the back surface of the blank is mechanically figured to create the requested lens.

The customized nature of eyewear lenses makes them ideal products for a more distributed and simple manufacturing process. An improved additive process for eyewear lens preparation would be beneficial. The lenses could be made on demand which has multiple benefits. Custom manufacturing lenses using an additive process removes the need to produce and store semi-finished blanks, eliminates material waste inherent in grinding, and reduces energy consumption by simplifying the overall process. Also, additive manufacturing allows for adding or embedding structures for upcoming technologies inside the lens including using mirrors, prisms, micro-lenses, diffraction gratings, light sources, and other techniques.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

An effective and innovative approach to improve the quality and optical performance of three-dimensional (3D) printed lenses is described herein. Systems and methods for increasing homogeneity of optical elements are described herein.

Optical elements, such as lenses or spectacle lenses, can be made in any suitable shape and geometry by an additive manufacturing process. Stereo lithography (SLA) 3D printers are one such method. SLA printers can be adapted to different growing strategies, can be used on top of different growing platforms and/or substrates, and are fast.

Manufacturing of spectacle lenses by additive processes provides some advantages for lens manufacturers, eye care practitioners and final customers (i.e., the lens user). Lens manufacturers may make lenses from scratch, without the need to buy and stock any blanks. Also, the additive manufacturing method is more environmentally friendly, as little or no waste is generated. Plus, making lenses by additive processes requires less energy than traditional techniques.

SLA printers create objects as a set of 3D pixels, also called voxels. The 3D objects made from those voxels may not be homogenous. Physical and chemical properties of the material may change across the interfaces between voxels. In particular, local density and refractive index can be two of the physical properties that change across the interfaces between voxels. The optical effect of these changes in the lens material, once the lens is grown in the SLA printer, is that light scatters and diffracts as it goes through the 3D printed lens, decreasing its optical performance.

SLA printing generally consists of shining ultra-violet (UV) light (e.g., with a wavelength of between 350 nm and 420 nm) in a very controlled way on a liquid resin contained in a tank. The UV light causes the resin to polymerize and turn into a solid. The desired object has a digital representation which is sliced into many layers. Each solid layer can be created on a previous solid layer by the polymerization of a liquid polymer layer through exposure to a pattern or image of UV light, e.g., from a scanning UV laser or a digital light processing (DLP) projector. With either the scanning laser or the DLP projector, the UV light shined on the resin is highly directional, and voxel structures are created on the polymer layer due to the pixels on the DLP projector image or lines made by the scanning laser.

Figure 1A:
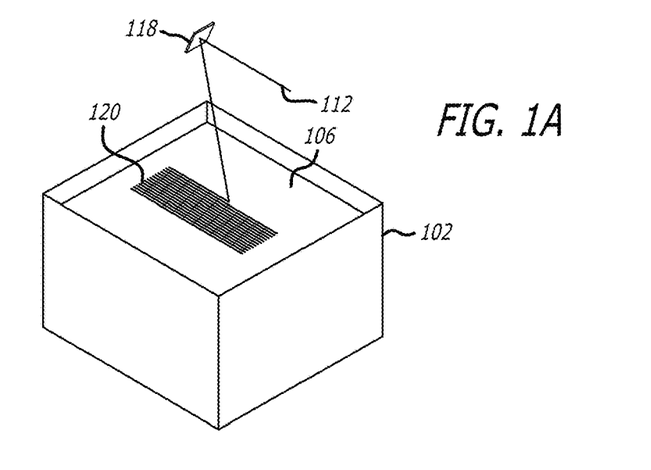
FIG. 1A is a schematic isometric view of a laser scanning stereolithography system for manufacturing of an optical element.
Figure 1B:
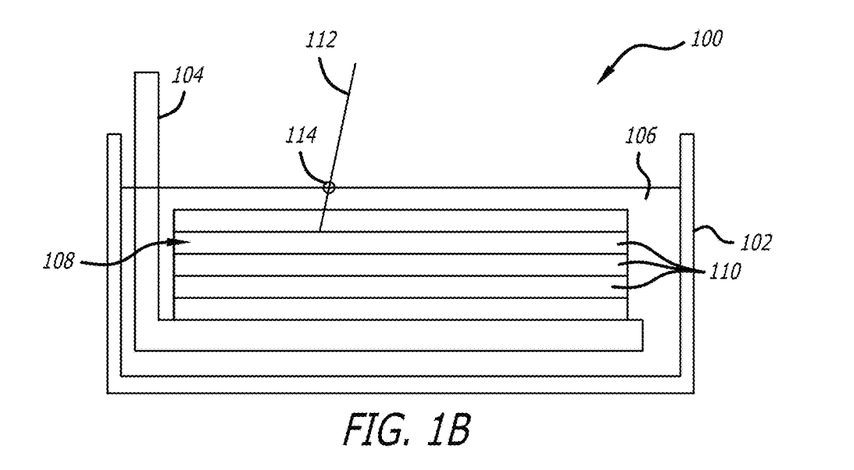
FIG. 1B is a schematic cross-sectional view of the system of FIG. 1A.
Figure 1C:
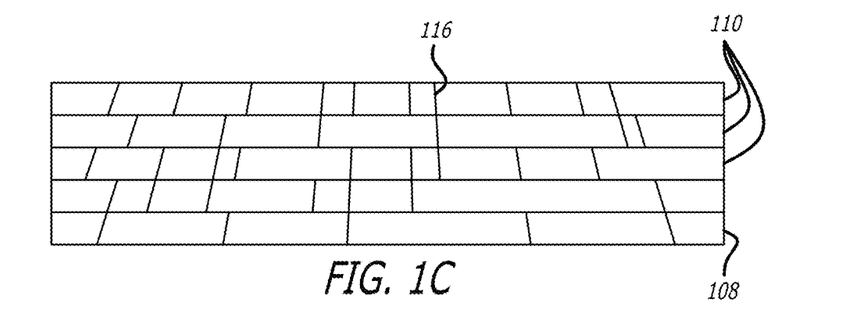
FIG. 1C is an enlarged cross-sectional view of the optical element manufactured by the system of FIG. 1A.

Referring now to FIGS. 1A, 1B, and 1C, a scanning laser SLA system includes a liquid resin 106 is inside a tank 102, and a support 104 to support an optical element 108 is immersed in the resin 106. As used herein, the term optical element includes lenses and spectacle lenses. A laser beam 112, e.g., a UV laser beam directed by a scanning mirror 118, impinges at different angles on the resin 106 along scanning lines 120 and polymerizes the resin 106 to form layers 110 of the optical element 108.

Figure 2:
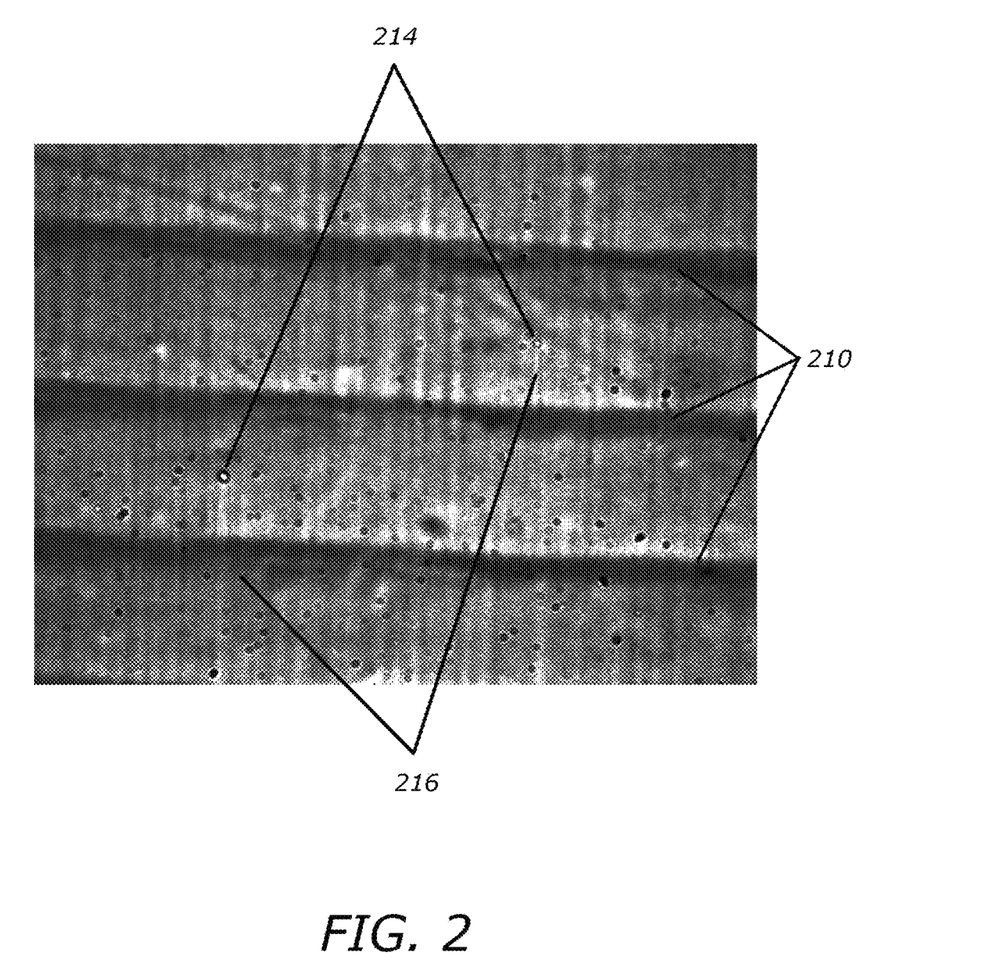
FIG. 2 is a photograph of a cross-section of an optical element manufactured by the system of FIG. 1A demonstrating defects, as shown in FIG. 1C.

Light from the laser beam 112 is directional, and any defect 114, such as a dust spot or bubble, on the surface of or in the resin can create a tube-like shadow along the direction of the impinging laser beam 112, causing a variation in irradiance and polymerization rate. The irradiance along this shadow may considerably differ from the irradiance at other points. The variation in polymerization rate can result in a non-homogeneous optical element 108 with defects 116, shown in FIG. 1C. The photographic microscope image of FIG. 2 shows a non-homogeneous optical element manufactured by a scanning laser SLA system, such as shown in FIGS. 1A and 1B. The defects 116 in the optical element resulting from the defects 114 in the resin 106 can have a linear shape oriented along the direction of the incoming light, but can be randomly distributed across the layers. Referring again to FIG. 2, horizontal dark lines 210 are the boundaries between layers, and vertical lines are variations of refractive index along the growing direction, caused by local variations of irradiance of the incoming light. In particular, micro-bubbles 214 created the tube-like structures 216. Similarly, other vertical lines were created by other defects not necessarily contained in the field of the photographic microscope image. As a result, the refractive index of the optical element 108 can vary, causing scatter light and inhibiting optical quality.

Figure 3:
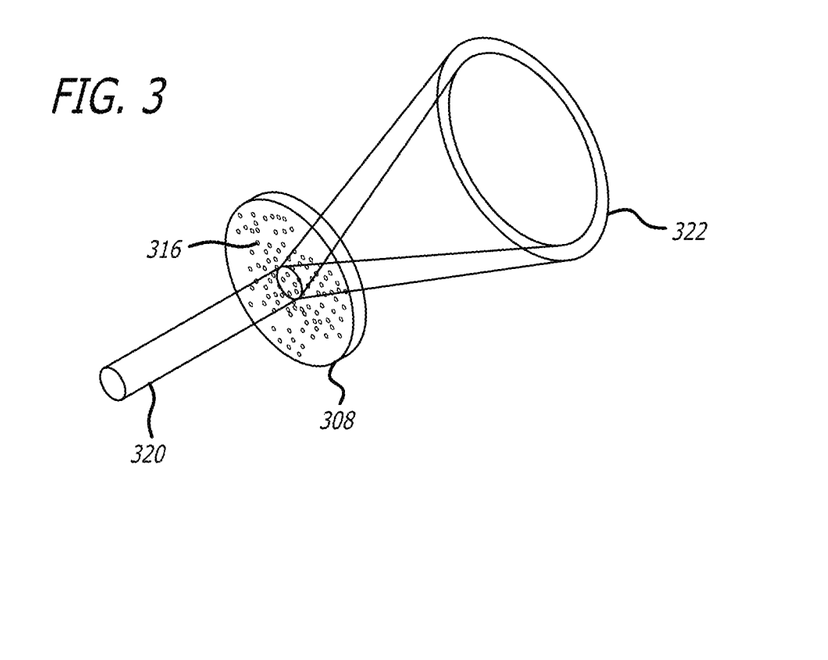
FIG. 3 is a schematic isometric view showing a light beam traveling through an optical element manufactured by the system of FIG. 1A.

FIG. 3 shows a light beam 320 traveling through a non-homogeneous optical element 308 manufactured by the system of FIGS. 1A, 1B, and 1C. When the light beam 320 impinges on the non-homogeneous optical element 308 with defects 316, e.g., variations in refractive index, the light beam 320 can be scattered, e.g., conically scattered 322, in an undesired manner as it passes through the optical element 308.

Figure 4:
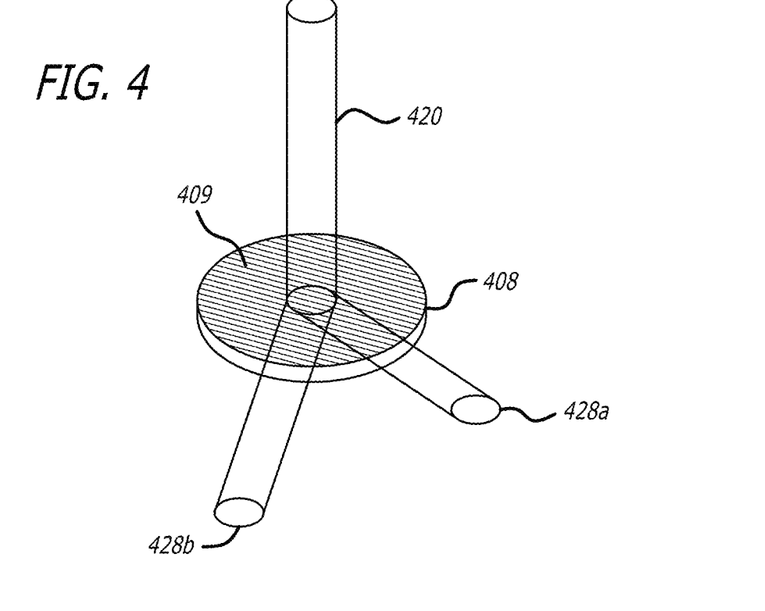
FIG. 4 is another schematic isometric view showing a light beam traveling through an optical element manufactured by the system of FIG. 1A.

Returning again to FIG. 1A, the overlapping of scanning lines 120 can produce some variation of irradiance. Since perfect matching of irradiance along consecutive scans is difficult or impossible, scanning of the laser beam 112 can produce a periodic irradiance pattern (e.g., a one-dimensional pattern) along the direction perpendicular to the line scans 120. Periodic irradiance can result in periodic variation of polymerization and a variation of physical properties of the optical element 108, such as refractive index. As shown in FIG. 4, when a light beam 420 impinges on a non-homogeneous optical element 408 with a periodic variation in refractive index 409, the light beam 420 will be diffracted into light beams 428a and 428b in an undesired manner.

Figure 5:
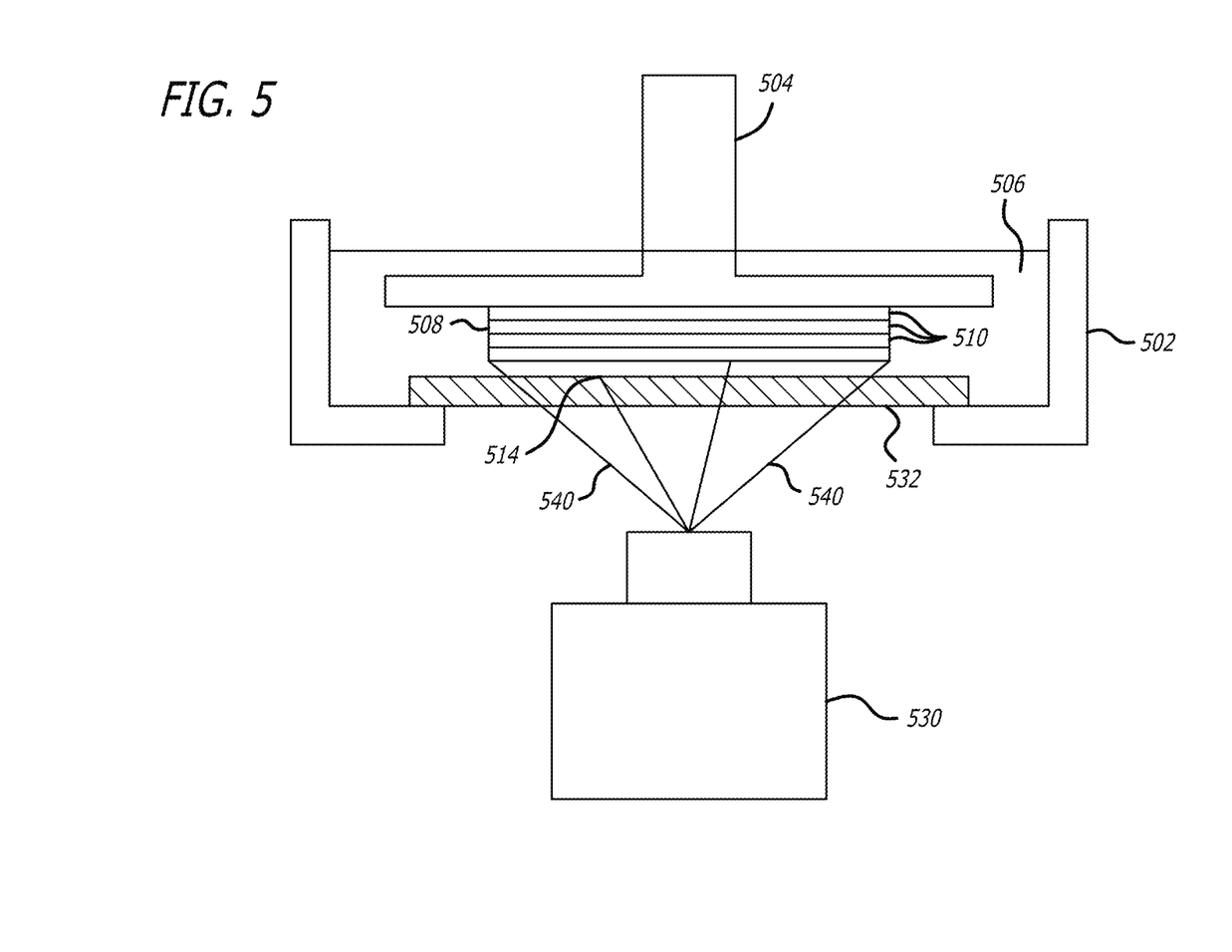
FIG. 5 is a schematic cross-sectional view of a digital light processing projector stereolithography system for manufacturing of an optical element.

Referring now to FIG. 5, a DLP projector SLA system includes a tank 502 containing a resin 506 and a support 504 to support an optical element 508 submerged in the resin 506. The DLP projector 530 can direct a pattern of light 540, e.g., UV light, on the resin 506 and polymerize the resin 506 to form layers 510 of the optical element 508. In the example shown in FIG. 5, the pattern of light 540 is directed through a transparent portion of the tank 502 (e.g., a glass bottom 532 of the tank). Polymer layers 510 of the optical element 508 are created on the support 504 (e.g., growing platform), such that the optical element 508 is created upside down. The DLP projectors can be based in any digital technology, such as liquid crystal display (LCD) filters and digital micromirror devices (DMDs). An advantage of DLP projector SLA systems is a faster printing process because an entire layer can be exposed at the same time. DLP projector SLA systems also have a simpler, more compact, and more cost-effective setup than a scanning laser SLA system.

Light from the DLP projector is strongly directional and local variations of irradiance between pixels or defects 514 will cast a shadow on the layer 510 that will produce a local variation of physical properties, such as refractive index. Defects on the glass, micro-bubbles on or in the resin, and irradiance variation from the pixels can produce a random set of defects in the optical element 508, similar to the defects 316 on optical element 308, shown in FIG. 3. These defects can propagate along the polymerization light direction and produce conical scattering.

Even if there were no defects and all pixels shined the same, significant variations of irradiance in the boundary between adjacent pixels would exist due to a fill factor of a light modulator used in the DLP projector being less than 100%, which can produce a two-dimensional periodic variation in the refractive index of the layer. As such, a pixel layout of a light modulator used in the DLP projector 530 can produce a regular, periodic two-dimensional variation of refractive index within each layer 510.

Figure 6:
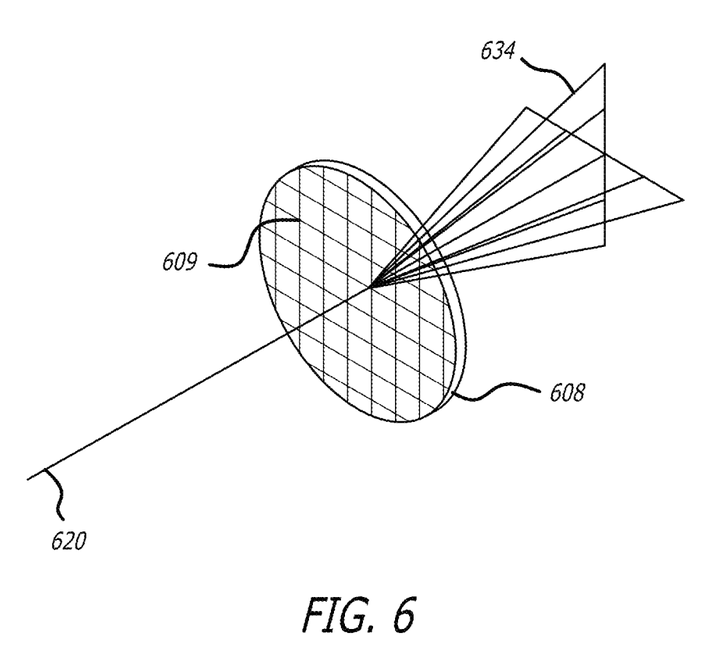
FIG. 6 is a schematic isometric view showing a light beam traveling through an optical element manufactured by the system of FIG. 5.

FIG. 6 shows a light beam 620 traveling through a non-homogeneous optical element 608 manufactured by the system of FIG. 5. When the light beam 620 impinges on the non-homogeneous optical element 608 with a two-dimensional periodic variation in refractive index 609, the emerging light 634 will be diffracted, inhibiting the optical properties of the optical element 608.

To make an optical element with suitable optical properties with an SLA printer, scattering and diffraction effects must be reduced to negligible amounts. With respect to DLP projector SLA printers, the periodic structure of light irradiance caused by the pixels of the digital light projector must be minimized.

Figure 7:
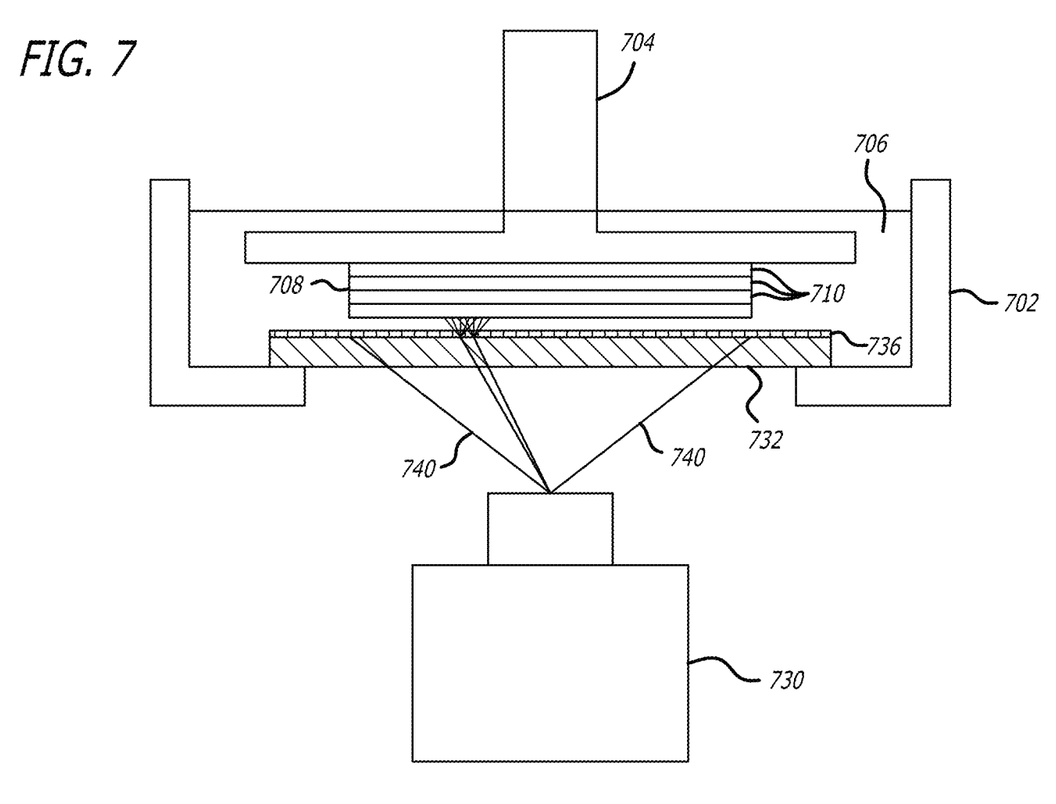
FIG. 7 is a schematic cross-sectional view of a system for additive manufacturing of a homogeneous optical element.

A DLP projector SLA system that minimizes scattering and diffraction effects by changing light impinging on the resin from directional to non-directional or diffuse is shown in FIG. 7. Here, periodic transverse variations of irradiance on the resin are reduced or eliminated. The tank 702 has a transparent portion 732, e.g., glass portion, between a DLP projector 730 and a support 704 for an optical element 708 so that light 740 from the DLP projector 730 passes through the transparent 732 to polymerize resin 706 to form each layer 710 of the optical element 708. A diffuser 736, e.g., a thin layer described in more detail below of a diffuser, is positioned between the transparent portion 736 and the resin 706 such that the light 740 passes through and is diffused by the diffuser 736 prior to impinging on the resin 706. As shown in FIG. 7, the diffuser 736 is in contact with the resin 706.

Because the diffuser 736 is close to the forming layer 710, the shape of the forming layer 710 will be preserved. With a diffuser 736 of sufficient diffusing properties, the directional properties of the light 740 from the DLP projector will be interrupted. Light 740 will impinge from different directions at various points on the resin 706. For example, light from points A and B on the diffuser 736 overlaps on the forming layer 710. As a result, shadows cast on the resin from defects are reduced or eliminated. The diffuser can also mix light from the pixel/inter-pixel structure to create a homogeneous irradiance pattern for the layer 710.

SLA printers may use a non-sticking material on the transparent portion, e.g., a silicone compound or a PTFE (polytetrafluoroethylene) film. For a silicone-based film, a diffusive material, such as compatible dyes, micro particles, or nano-particle aggregates, can be incorporated into the film to create the diffuser 736. For example, a 200 micron thick silicone-based film can be applied on the transparent portion 732, where compatible dyes are incorporated in the film in quantities up to 3% of the weight of the film. The diffusive properties of this film are sufficient to reduce or eliminate both pixelation and directionality of the light from the DLP projector without significant light absorption.

In another example of an effective diffuser, a thin opal glass layer from 10 to 100 microns thick positioned on the transparent portion 732 can form the diffuser 736. Opal glass has excellent diffusing characteristics, and can behave as a lambertian diffuser.

In yet another example of an effective diffuser, a holographic diffuser is positioned on the glass 732 to precisely control the amount of scattering and fine tune the balance between available power and light diffusion. For example, a holographic diffuser can be formed from photopolymers. A holographic diffuser can be formed by embossing or machining a small scale pattern on a material with desired optical properties.

Figure 8:
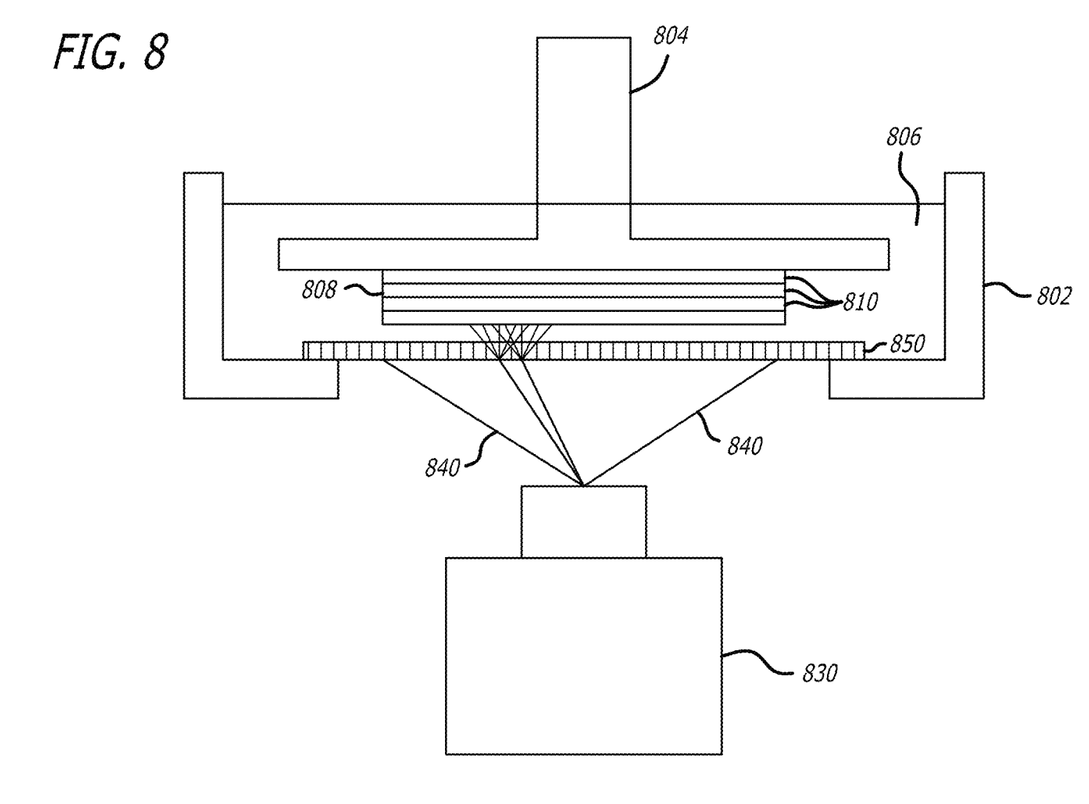
FIG. 8 is a schematic cross-sectional view of another system for additive manufacturing of a homogeneous optical element.

Another version of a DLP projector system that minimizes scattering and diffraction effects is shown in FIG. 8. A back surface of a transparent portion 850, for example, a glass portion, of tank 802 between optical element 808 and DLP projector 830 windows can be made diffusive by grinding the transparent portion 850 with a grinder of adequate grit, for example, aluminum oxide with 400 grit number.

Figure 9:
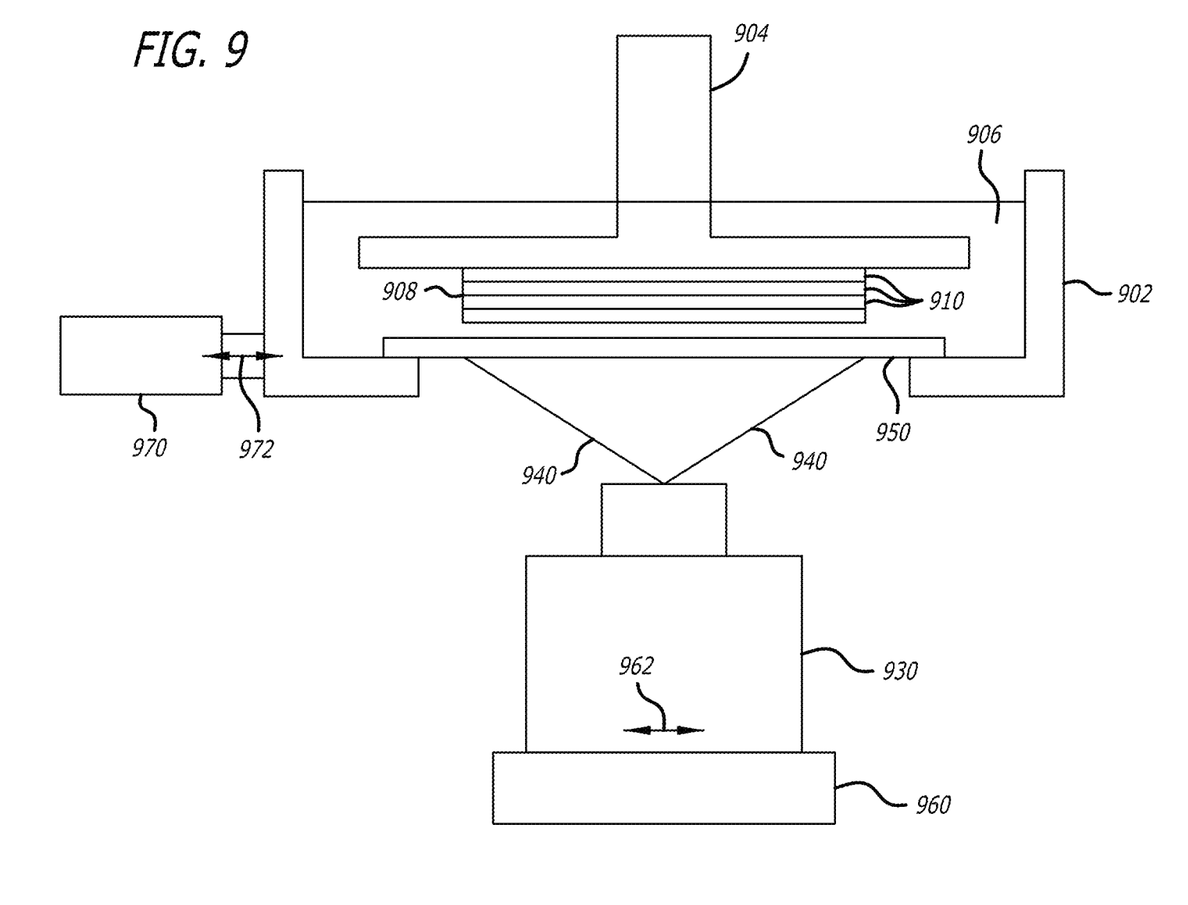
FIG. 9 is a schematic cross-sectional view of another system for additive manufacturing of a homogeneous optical element.

Another version of a DLP projector SLA system that minimizes scattering and diffraction effects is shown in FIG. 9. Quasi-random transverse vibration of DLP projector 930 and/or tank 902 can change light impinging on the resin 906 from directional to non-directional or diffuse and reduce or destroy periodical transverse variations of irradiance. A vibration device 960, e.g., an XY piezoelectric device, can be commanded to move in a transverse direction 962 (e.g., along an X axis and/or an Y axis) with a random amplitude the size of 1.5 pixels. The period of the vibration can be less than a tenth of the polymerization time per layer. For example, modern piezoelectric actuators or voice-coil actuators can create this movement. Vibration of only the DLP projector 930 may not remove the effect of linear defects on the resin 906 causing conical scattering. To remove these defects, a vibration device 970, e.g., a piezoelectric device, should also vibrate the tank 902 in a transverse direction 972. In another version of the DLP projector SLA system, a mechanical vibrator to vibrate the glass 950 may be added to enhance removal of these defects.

Figure 10:
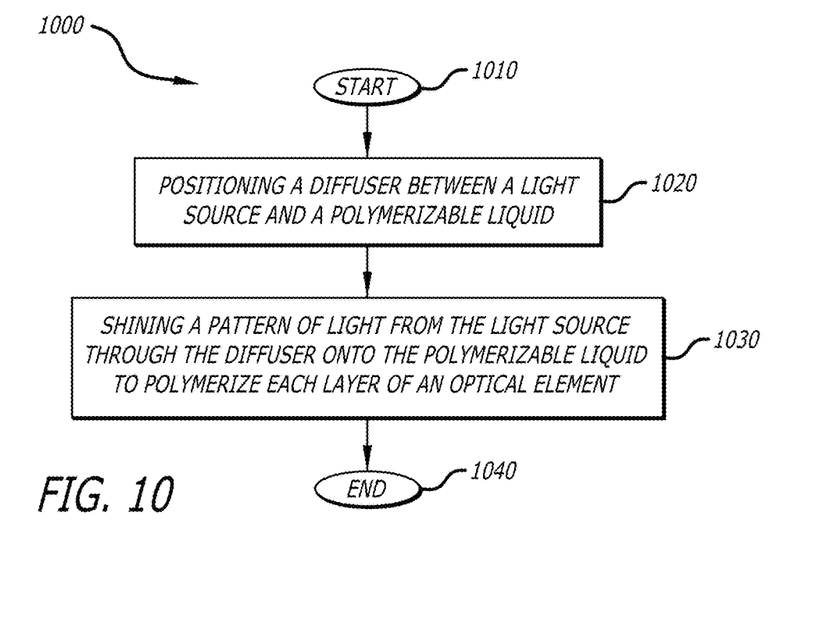
FIG. 10 is a flow chart of a process for producing a homogeneous optical element.

Referring to FIG. 10, a process 1000 of creating homogeneous optical elements by additive manufacturing that starts at 1010 and ends at 1040 is shown. At 1020, a diffuser is positioned between a light source, e.g., a UV light source with a wavelength of between 350 nm and 420 nm, and a polymerizable liquid, such as a polymerizable resin. At 1030, a pattern of light from the light source is shined through the diffuser onto the polymerizable liquid to polymerize each layer of an optical element. This process may be implemented according to one of the DLP projector SLA systems described above in FIGS. 7 and 8.

Figure 11:
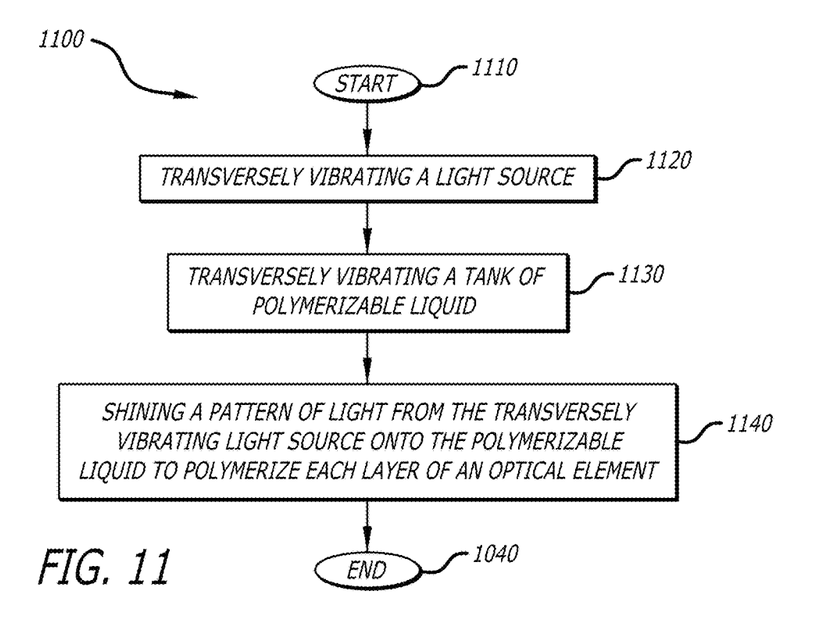
FIG. 11 is a flow chart of another process for producing a homogeneous optical element.

Referring to FIG. 11, another process 1100 of creating homogeneous optical elements by additive manufacturing that starts at 1110 and ends at 1140 is shown. At 1120, a light source, e.g., a UV light source with a wavelength of between 350 nm and 420 nm, is transversely vibrated. At 1130, a tank of a polymerizable liquid, such as a polymerizable resin, is transversely vibrated. At 1140, a pattern of light from the transversely vibrated light source is shined onto the polymerizable liquid to polymerize each layer of an optical element. This process may be implemented according to the DLP projector SLA systems described above in FIG. 9.

The systems and methods described herein are particularly suitable for prescription eyewear and ophthalmic lenses but may also be used for improving any lenses or optical elements made by an additive process.

The lenses may be produced with the contour of the frame it will be put in, and optical and ergonomic criteria can be taken into account during lens design. The systems and methods described herein have as a prerequisite that the optimum surfaces—arc, curvature, and the like—of the lens have been computed and properly described according to techniques known to those skilled in the art.

The polymerizable liquid material is a monomer, oligomer, or prepolymer which can be cured to a solid transparent polymer in response to application of UV light (e.g., with a wavelength of between 350 nm and 420 nm) or other curing agent. The polymerizable liquid materials include monomers, oligomers, polyester resins, acrylic resins, and epoxy resins.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for additive manufacturing an optical element formed of layers, the method comprising:
   positioning a diffuser between a light source and a light polymerizable liquid, wherein the diffuser is in contact with the light polymerizable liquid; and
   for each of the layers of the optical element, shining a pattern of light from the light source through the diffuser onto the light polymerizable liquid to homogeneously polymerize the layer including the diffuser changing the light from the light source from directional to non-directional to reduce scattering and diffraction effects to a negligible amount when the optical element is formed.

2. The method of claim 1, wherein the diffuser comprises silicone.

3. The method of claim 1, wherein the diffuser is a silicone film comprising a dye.

4. The method of claim 3, wherein the silicone film is about 200 microns thick.

5. The method of claim 3, wherein the dye is up to 3% of the weight of the silicone film.

6. The method of claim 1, wherein the diffuser comprises an opal glass layer.

7. The method of claim 6, wherein the opal glass layer is between 9 microns and 101 microns thick.

8. The method of claim 1, wherein the diffuser is a holographic diffuser.

9. The method of claim 1, wherein the diffuser is a ground surface of a tank holding the light polymerizable liquid.

10. The method of claim 1, wherein the diffuser is positioned on a transparent portion of a tank holding the light polymerizable liquid.

11. The method of claim 1, wherein the light source is UV light with a wavelength of between 350 nm and 420 nm.

12. The method of claim 1, wherein the light source is a digital light processing projector.

13. The method of claim 1, wherein the light polymerizable liquid is a UV light polymerizable resin.

14. A system for additively manufacturing an optical element formed of layers, the system comprising:
   a light source to generate a pattern of light for each layer;
   a diffuser to homogenize the pattern of light for each layer and to change the light from the light source from directional to non-directional to reduce scattering and diffraction effects to a negligible amount when the optical element is formed; and
   a light polymerizable liquid to polymerize each layer in response to receiving the pattern of light for that layer, wherein the diffuser is in contact with the light polymerizable liquid.

15. The system of claim 14, wherein the homogenized pattern of light is non-directional.

16. The system of claim 14, wherein the light source is a digital light processing projector.

17. The system of claim 14, wherein the diffuser comprises silicone.

18. The system of claim 14, wherein the diffuser is a silicone film comprising a dye.

19. The system of claim 18, wherein the silicone film is about 200 microns thick.

20. The system of claim 18, wherein the dye is up to 3% of the weight of the silicone film.

21. The system of claim 14, wherein the diffuser comprises an opal glass layer.

22. The system of claim 21, wherein the opal glass layer is between about 10 microns and about 100 microns thick.

23. The system of claim 14, wherein the diffuser is a holographic diffuser.

* * * * *